Jan. 30, 1940.  A. CLAUD-MANTLE  2,188,333
LATCH, SAFETY CATCH, AND LIFTING MECHANISM FOR LID TYPE AUTOMOBILE HOODS
Filed Oct. 17, 1938
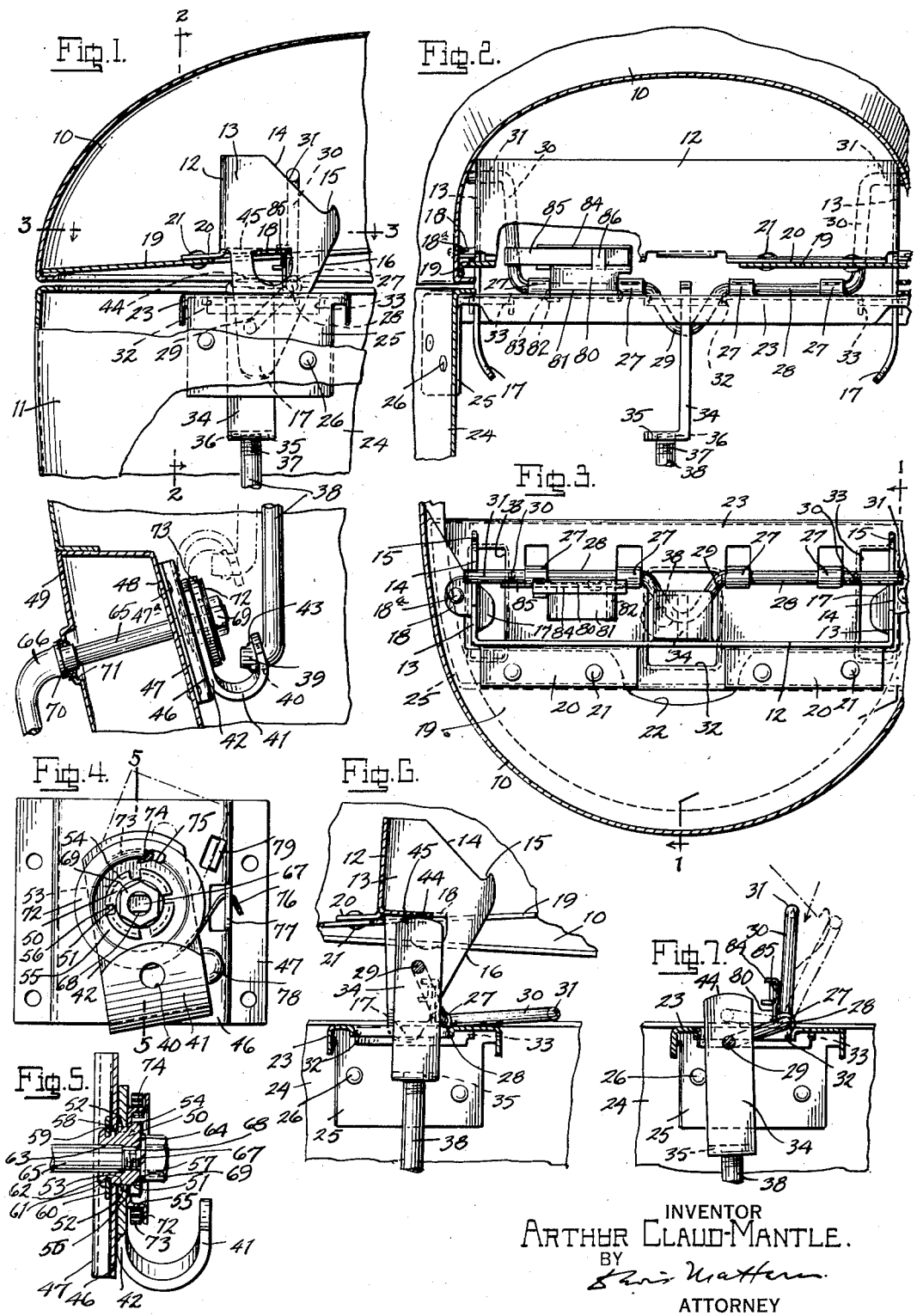
INVENTOR
ARTHUR CLAUD-MANTLE.
BY
ATTORNEY Patented Jan. 30, 1940

2,188,333

UNITED STATES PATENT OFFICE 2,188,333

LATCH, SAFETY CATCH, AND LIFTING MECHANISM FOR LID TYPE AUTOMOBILE HOODS

Arthur Claud-Mantle, Trumbull, Conn., assignor to The Bassick Company, Bridgeport, Conn., a corporation of Connecticut Application October 17, 1938, Serial No. 235,367

7 Claims. (Cl. 292—214)

The present invention relates to an improvement in latch, safety catch and lifting mechanism for lid type automobile hoods, particularly of the alligator type which are hinged to the cowl at the rear of the engine compartment, the forward end of the hood adapted to be swung upwardly in the open position. Because of the arrangement of the forward swinging end of the hood, where relative air currents produced during forward travel of the automobile exert forces which tend to open the hood, it is especially desirable that the latch means be so connected at all times in the closed position of the hood that there will be no possibility of the hood accidentally raising, as the accidental and unexpected raising of the hood will obstruct the vision of the driver and is very apt to result in serious accident. It is an object of the invention to provide a latch mechanism having safety catch means whereby the closed hood is restrained from accidental opening, irrespective of whether the latch has been manually actuated to its normal latching position.

Another object is to provide a latch in which resilient means is employed for automatically positioning the latch parts in the open position of the hood in such relation that such parts will automatically engage when the hood is closed. A further object is to provide a latch mechanism in which the hood means for cooperating with the movable parts of the latch will function as centralizing means to insure the proper centralized engagement of the hood in its closed position.

A further object is to provide a remote actuating means for the latch mechanism in which the actuating handle will be disposed in an inconspicuous but conveniently accessible position, and particularly it is proposed to provide such actuating handle at the lower end of the radiator grill. Another object is to provide latch mechanism which will occupy relatively small space where such mechanism will not interfere with the operating parts of the automobile. A further object is to provide a latch mechanism which will form a structural reinforcing structure for the forward end of the engine compartment and hood.

Another object is to provide a latch mechanism which upon being actuated to unlatching position will impart an initial raising movement to the hood and will thereupon support the hood in such initially raised position, whereupon it may be conveniently raised to full open position.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is a vertical longitudinal sectional view of the forward end of the engine compartment of the automobile and the closed hood, showing the latch mechanism incorporated therein in the normal latched position, the dot-and-dash lines indicating the position of the actuating lever when moved to actuate the mechanism to unlatching position. The upper portion of this illustration is taken along the line 1—1 of Fig. 3, and the lower portion is taken along the central vertical longitudinal plane.

Fig. 2 is a fragmentary vertical sectional view of the upper portion of the engine compartment showing the upper part of the latch mechanism shown in latched condition, the section being taken along the line 2—2 of Fig. 1.

Fig. 3 is a horizontal sectional plan view, taken along the line 3—3 of Fig. 1.

Fig. 4 is an enlarged detail elevation of the actuating lever mechanism.

Fig. 5 is a vertical sectional view, taken along the line 5—5 of Fig. 4.

Fig. 6 is a fragmentary vertical sectional view, taken along the central vertical longitudinal plane, and showing the latch mechanism actuated to its unlatching position and the hood supported in its initially raised position.

Fig. 7 is a vertical longitudinal sectional view of the latch mechanism in the position it assumes in the open position of the hood, the dot-and-dash lines showing the manner in which the torsion latching rod is swung during closing of the hood.

Similar reference characters indicate corresponding parts throughout the several figures of the drawing.

Referring to the drawing, the exemplary embodiment of the invention illustrated therein is adapted for incorporation in an automobile structure in which the hood 10 is hinged at its rearward end to the cowl at the rearward end of the engine compartment, the forward end adapted in the closed position to close upon the forward or radiator grill end 11 of the engine compartment.

A vertically disposed transverse beam member 12, which is adapted as will presently more fully appear to be rigidly secured to the hood, is provided at each of its ends with a rearwardly bent hook and centralizing guide flange portion 13 provided along its upper edge with a downwardly and rearwardly inclined cam surface 14, terminating at its rearward end in an upwardly curved hook portion 15, the rearward edge being curved downwardly from this hook portion 15 and being inclined downwardly and forwardly, as at 16, to provide a guide surface for engagement with the movable parts of the mechanism during closing of the hood, this edge 16 terminating in an inwardly curved lead portion 17 adapted to guide the hood into centralized position, and as will hereinafter more fully appear.

An attaching ear 18 is lanced from the portion 13 and bent outwardly and is rigidly secured by a rivet 18ª to the side portion of a reinforcing plate 19 secured within the hood. The beam 12 is provided at its lower edge with forwardly bent flanges 20—20 which are rigidly secured to the forward portion of the reinforcing plate 19 by means of rivets 21. The inner ends of the flanges 20 are spaced apart and the central portion of the rearward edge of the reinforcing plate 19 is cut out, as at 22, to provide a clearance space, as shown in Fig. 3.

A horizontally disposed transverse channel beam 23, for carrying the latching parts, extends between the side walls 24 of the engine compartment and is provided at its ends with attaching flanges 25 rigidly secured by rivets 26 to said side walls. A series of axially aligned loop portions 27 are provided along the upper surface of the beam 23 near its rearward edge, these loop portions being preferably lanced and bent from the metal of the beam. A torsion latching rod 28 has bearing in the bearing portions 27, and is provided at its central portion between the two spaced centrally disposed loop portions 27 with a V-shape crank portion 29. At each of its ends the rod 28 is provided with an upwardly extending leg portion 30 and an outwardly extending latch portion 31.

A rectangular downwardly flanged opening 32 is provided in the central area of the beam 23 in relation to the crank portion 29, and within which the crank portion and its actuating means, hereinafter more fully referred to, are adapted to move. At each of the end areas of the beam 23 there is provided a rectangular downwardly flanged opening 33, the outer flange wall of which is adapted to be engaged by the hook and centralizing portions 13 of the beam 12 in the closed position of the hood, as indicated in Fig. 2, the curved lead portions 17 guiding said portions 13 into centralized position. It should be here pointed out that in the closed position of the hood the catch portions 31 of the torsion rod engage the inclined cam surfaces 14 of the flange portions 13 under torsion set up by relative turning movement between the leg portions 31 and the crank portion 29 of the torsion rod.

An apertured bar 34 is connected to the crank portion 29 of the torsion rod 28, and is provided at its lower end with a right angularly bent portion 35 having a tapped hole 36 therein in which is screwed the upper threaded end 37 of the actuating rod 38, this rod extending downwardly to the lower portion of the radiator grill where its lower end is bent at a right angle, as at 39, and is engaged in the aperture 40 in the upwardly bent lower end 41 of the actuating lever 42, the end 39 of the rod being retained in relatively loose engagement with the aperture 40 by means of swedged lugs 43.

The upper end of the bar 34 which extends upwardly through the opening 32 in the beam 23 is provided with a rounded contact surface 44, which in the closed position of the hood is disposed in spaced relation beneath a horizontally disposed flange 45 bent forwardly from the lower edge of the beam 12 at its central portion between the two attaching flanges 20—20, and which engages said flange for the purpose of initially raising the hood when the latch is actuated to open position, as will hereinafter more fully appear.

The actuating lever 42 is rotatably mounted upon a plate 46 provided with forwardly offset attaching flanges 47 which are secured by rivets 47ª to the inner wall portion 48 of the frame structure 49 at the lower end of the radiator grill. The lever 42 is non-rotatably secured to a hub 50 and for this purpose the hub is provided with a series of slots 51 in its outer surface which are engaged by inwardly projecting splines 52 provided in the apertures 53 of the lever. The hub is flanged at its outer end, as at 54, and between this flange and the outer surface of the lever 42 there is rigidly secured a spring mounting cup member 55, this member having also inwardly projecting splines 56 provided in its aperture 57, and which also engage the slots 51 of the hub.

The hub is provided with a shouldered reduced bearing portion 58 which is rotatably engaged in the aperture 59 in the plate 46, and it is retained by means of a washer 60 engaged upon a reduced shouldered extension 61 of the hub and secured by swedging of the outer end of the hub, as at 62. The hub is provided with a shouldered passage 63, the forward portion of which is cylindrical and the rearward portion of which is provided with opposed flat surfaces 64, and this passage is engaged by the inner end of the shaft 65 of the actuating handle 66, this inner end of the shaft being provided with a reduced threaded shank 67 having opposed flat surfaces 68 and which threaded extension is non-rotatably engaged in the forward inner end portion of the passage through the hub, the shaft being secured in place by a nut 69 engaged upon the projecting end of the threaded portion 67. The handle 66 is provided with a flanged bearing portion 70 which has bearing in a bearing aperture 71 formed in the forward wall of the frame portion 49.

The spring cup member 55 is provided with an outwardly extending flange 72, and between this flange and the lever 42 there is disposed a spiral spring 73 having its inner end hooked, as at 74, and engaged in a slot 75 in the periphery of the cup member, and having its outer end hooked, as at 76, and engaged with a slotted ear 77 lanced and bent upwardly from one side of the plate 46. The spring is normally under tension to rotate the lever in counter-clockwise direction and is adapted to be wound and further tensioned by rotation of the lever 42 in clockwise direction, from the full line position, in Fig. 4, to the dot-and-dash line position.

A stop lug 78 is pressed up from the surface of the plate 46 and is engaged by one edge of the lever 42 to limit the rotation of the lever 42 in counter-clockwise direction, this position of the lever being the over center position with respect to the axis of rotation of the lever and the longitudinal axis of the rod 38. Another stop lug 79 is bent outwardly from the plate 46, and is adapted to limit the movement of the lever in clockwise direction to a position, also over the center, so that the effective range of movement of the lever is somewhat in excess of 180°. The disposition of the plate with respect to the actuating rod 38 is such that the line between the point of connection of the rod with the lever 42 and the point of connection of the bearing 34 with the torsion rod 28 is at one side of the axis of rotation lever 42 in the normal latching position, as shown in full lines in Figs. 1 and 4, this being the over center position in which the rod is retained through torsion set up in the torsion rod 28, as will presently more fully appear.

Upon the beam 23 there is provided an upstanding bracket 80 having its horizontally bent base 81, secured by lugs 82 inserted through slots 83 in the beam and bent over on the under side, this bracket being provided with a horizontal channel 84 in which a leaf spring 85 is secured by means of a lug 86, this leaf spring being disposed in substantially parallel relation to the torsion rod 28 and projecting from one end of the bracket into engagement with the leg portion 30 of the torsion rod at one end of the rod, the end of this leaf spring being normally curved rearwardly, so that in the unlatched position of the torsion rod, as shown in Fig. 7, the leg is restrained by the spring from assuming its normal latching position, as shown in Fig. 1.

The operation is as follows:

As shown in Fig. 1, and in full lines in Fig. 4, the actuating lever 42 is in the over center latching position, and the torsion rod is under torsion, set up by relative turning of the crank portion 29 in counter-clockwise direction with respect to the leg portions 30 and the latching portions 31 engaged with the inclined cam surfaces 14 of the retaining hook portions 13. In order to release the catch the handle 66 is turned to rotate the lever 42 in clockwise direction, overcoming the torsion of the torsion rod to the point where the lever swings past the dead center, whereupon the rotation of the lever 42 is continued against the force of the spring 73 causing this spring to be wound. As the rotation of the lever 42 is continued the rod 38 is moved upwardly, rotating the torsion rod 28 to disengage the latching end portions 31 from the cam surfaces 14 and continuing to the position shown in Fig. 6, the upper end 44 of the bar 34 in the meantime having engaged the flange 46 of the beam 12, causing the hood to be raised simultaneously with the unlatching action. In moving into this position the lever 42 is moved over its dead center to the dot-and-dash line position shown in Fig. 4 against the stop 79, the weight of the hood being imposed upon the rod 38 of the lever 42 as soon as the lever moves over the dead center, and being sufficient to overcome the tendency of the wound spring 73 to rotate the lever 42 in counter-clockwise direction. The parts of the catch mechanism will remain in the supporting position as shown in Fig. 6, to support the hood in its initially raised position, until such time as the hood is manually raised to its full open position.

As soon as the hood is manually raised from the position shown in Fig. 6 the wound spring 73 swings the lever 42 in counter-clockwise direction to a point short of the dead center where further movement is restrained through engagement of the leg portion 30 of the torsion rod 28 with the spring 85, as shown in full lines in Fig. 7, the force of this spring being sufficiently great to prevent the partially unwound spring 73 from moving the lever 42 to its over center position, as shown in Fig. 4. The latching parts are now in such position that when the hood is closed the guide surface 16 will engage forwardly of the latching end portions 31, and swing the torsion lever in clockwise direction over the hook ends 15 into engagement with the cam surfaces 14 where they will be retained by the force of the spring 73 exerted downwardly upon the rod 38. This is the safety catch position which will retain the hood against opening in the event that raising force is accidentally exerted thereon before the latch is manually actuated to its normal latched position, the hook ends 15 preventing disengagement of the latching ends 31 from the cam surfaces 14. The latch is now actuated to latching position by turning the handle 66 to rotate the lever 42 in counter-clockwise direction over the dead center, at the same time setting up torsion in the torsion rod by the down pull on the rod 38, which torsion thereupon exerts an upward pull on the rod 38 to retain the lever 42 in its over center latching position against the stop 78.

I have illustrated and described a preferred and satisfactory embodiment of the invention, but it will be understood that changes may be made therein, within the spirit and scope thereof, as defined in the appended claims.

Having thus described my invention, what I claim and desire to secure by Letters Patent is:

1. In a latching mechanism for releasably securing a lid type automobile hood member or the like to an engine compartment member or the like, in which a fixed latching part and a fixed abutment part are carried by one of said members, movable latching means adapted to be carried by the other of said members for cooperation with said fixed latching part, said latching means comprising a support, a latching member movably mounted on said support and movable between latching and unlatching positions, and lifting means associated with said latching member adapted upon movement to unlatching position to engage said abutment part to cause relative lifting movement of said hood, means actuated by the weight of said hood adapted in the engaged relation of said lifting means with said fixed abutment part to retain said latching means in unlatching position, said fixed latching part including a latching surface adapted to be engaged by said latching means in closed position of the hood.

2. In a latching mechanism for releasably securing a lid type automobile hood member or the like to an engine compartment member or the like, in which a fixed latching part and a fixed abutment part are carried by one of said members, movable latching means adapted to be carried by the other of said members for cooperation with said fixed latching part, said latching means comprising a support, a latching member movably mounted on said support and movable between latching and unlatching positions, and lifting means associated with said latching member adapted upon movement to unlatching position to engage said abutment part to cause relative lifting movement of said hood, means actuated by the weight of said hood adapted in the engaged relation of said lifting means with said fixed abutment part to retain said latching means in unlatching position, and spring means arranged to exert pressure to move said latching means in latching direction upon release of said weight, said fixed latching part including a latching surface adapted to be engaged by said latching means in closed position of the hood.

3. In a latching mechanism for releasably securing a lid type automobile hood member or the like to an engine compartment member or the like, a fixed latching part and a fixed abutment part adapted to be carried by one of said members, and movable latching means adapted to be carried by the other of said members for cooperation with said fixed latching part, a support, a latching member movably mounted on said support and movable between latching and unlatching positions, manually rotatable actuating lever means, a movement transmitting member connected between said latching member and said lever means, stop means adapted to limit the movement of said lever means, the limits of movement being respectively the latching and unlatching positions, spring means arranged to releasably retain said actuating means in its latching position, means carried by said movement transmitting member adapted upon movement to unlatching position to engage said fixed abutment part to impart lifting movement to the hood, the weight of said hood adapted to releasably retain said lever means in its unlatching position, said fixed latching part including a latching surface adapted to be engaged by said latching means in closed position of the hood.

4. In a latching mechanism for releasably securing a lid type automobile hood member or the like to an engine compartment member or the like, a fixed latching part and a fixed abutment part adapted to be carried by one of said members, and movable latching means adapted to be carried by the other of said members for cooperation with said fixed latching part, a support, a latching member movably mounted on said support and movable between latching and unlatching positions, manually rotatable actuating lever means, a movement transmitting member connected between said latching member and said lever means, stop means adapted to limit the movement of said lever means to a range in excess of 180°, the limits of movement being respectively the latching and unlatching positions, spring means arranged to releasably retain said actuating means in its latching position, said lever means in its limit positions being at over center points with respect to the force line of said spring means, whereby in the latching position the force of said spring means releasably retains said lever in latching position, means carried by said movement transmitting member adapted upon movement to unlatching position to engage said fixed abutment part to impart lifting movement to the hood, the weight of said hood adapted to releasably retain said lever means in its over center unlatching position, said fixed latching part including a latching surface adapted to be engaged by said latching means in closed position of the hood.

5. In a latching mechanism for releasably securing a lid type automobile hood member or the like to an engine compartment member or the like, a fixed latching part and a fixed abutment part adapted to be carried by one of said members, and movable latching means adapted to be carried by the other of said members for cooperation with said fixed latching part, a support, a latching member movably mounted on said support and movable between latching and unlatching positions, manually rotatable actuating lever means, a movement transmitting member connected between said latching member and said lever means, stop means adapted to limit the movement of said lever means, the limits of movement being respectively the latching and unlatching positions, spring means arranged to releasably retain said actuating means in its latching position, means carried by said movement transmitting member adapted upon movement to unlatching position to engage said fixed abutment part to impart lifting movement to the hood, the weight of said hood adapted to releasably retain said lever means in its unlatching position, and spring means associated with said lever means adapted to exert spring pressure thereon in unlatching direction, said fixed latching part including a latching surface adapted to be engaged by said latching means in closed position of the hood.

6. In a latching mechanism for releasably securing a lid type automobile hood member or the like to an engine compartment or the like, a fixed latching part and a fixed abutment part adapted to be carried by one of said members, and movable latching means adapted to be carried by the other of said members for cooperation with said fixed latching part, said latching means comprising a support, a latching torsion rod member rotatably mounted on said support for rotating about a longitudinal axis between latching and unlatching positions, said torsion rod having a radially extending crank portion and a radially extending latching portion, relative turning movement between said crank and latching portions adapted to set up spring torsion in said rod, an actuating member engaged with said crank portion, and lifting means associated with said actuating member adapted upon movement to unlatching position to engage said abutment part to cause relative lifting movement of said hood, means actuated by the weight of said hood adapted in the engaged relation of said lifting means with said fixed abutment part to retain said latching means in unlatching position, and spring means arranged to exert pressure to move said latching means in latching direction upon release of said weight, said fixed latching part including a latching surface adapted to be engaged by said latching means in closed position of the hood.

7. In a latching mechanism for releasably securing a lid type automobile hood member or the like to an engine compartment member or the like, a fixed latching part and a fixed abutment part adapted to be carried by one of said members, and movable latching means adapted to be carried by the other of said members for cooperation with said fixed latching part, said latching means comprising a support, a latching member movably mounted on said support and movable between latching and unlatching positions, and lifting means associated with said latching member adapted upon movement to unlatching position to engage said abutment part to cause relative lifting movement of said hood, spring means having greater resistance than the pressure of said last mentioned spring means arranged to limit the movement of said latching means in latching direction to a position short of its full latching position, said fixed latching part including a latching surface adapted to be engaged by said latching means in closed position of the hood.

ARTHUR CLAUD-MANTLE.